UNITED STATES PATENT OFFICE.

OLIVE M. HECHTMAN, OF WASHINGTON, DISTRICT OF COLUMBIA.

EFFERVESCENT BEVERAGE.

SPECIFICATION forming part of Letters Patent No. 482,738, dated September 20, 1892.

Application filed November 14, 1890. Renewed July 14, 1892. Serial No. 440,036. (No specimens.)

*To all whom it may concern:*

Be it known that I, OLIVE M. HECHTMAN, a citizen of the United States, residing at Washington, District of Columbia, have invented a new and useful Effervescent Beverage, of which the following is a specification.

My invention relates to a new and useful composition of matter to be used as a beverage.

My composition consists of the following ingredients combined in the proportions stated, viz: pure sugar, forty-eight pounds; water, one barrel; raspberry-juice, eleven ounces; tartaric acid, nine ounces; citric acid, nine ounces; soap-bark, two to six ounces or one handful; caramel or coloring, fifteen ounces; cooking-raisins, forty-eight ounces. These ingredients are to be thoroughly mingled by agitation in cask or other receptacle.

To produce effervescence in the above compound the following ingredients are combined in these proportions: one and one-fourth pounds pure honey and one gallon boiling water. Dissolve and allow mixture to stand until cool. Then add the whites of nine eggs, well beaten, and mix the compound with the composition in cask or other receptacle.

I desire to state that the proportions in which the ingredients of the herein-mentioned composition are combined may be varied, and that I am not aware of any composition other than this in which all of the ingredients in the proportions stated have been used together.

Having thus described my invention, what I claim, and desire to secure by Letters Patent of the United States, is—

The herein-described composition of matter to be used as a beverage, consisting of pure sugar, water, raspberry-juice, tartaric acid, citric acid, soap-bark, caramel or coloring, and cooking-raisins, in the proportions desired, with a mixture to cause effervescence, composed of pure honey, boiling water, and the whites of nine eggs.

In testimony whereof I affix my signature in presence of two witnesses.

OLIVE M. HECHTMAN.

Witnesses:
   CHAS. F. MALLARD,
   C. H. DOUGLAS.